United States Patent [19]

Arita

[11] Patent Number: 4,812,692
[45] Date of Patent: Mar. 14, 1989

[54] MOTOR

[75] Inventor: Yoji Arita, Nagareyama, Japan

[73] Assignees: Mitsubishi Chemical Industries Limited; Mitsubishi Steel MFG Co., Ltd., both of Tokyo, Japan

[21] Appl. No.: 149,923

[22] Filed: Jan. 29, 1988

Related U.S. Application Data

[63] Continuation of Ser. No. 856,354, Apr. 28, 1986, abandoned.

[30] Foreign Application Priority Data

Apr. 30, 1985 [JP] Japan .................................. 60-90980

[51] Int. Cl.$^4$ ............................................. H02K 23/40
[52] U.S. Cl. .................................. 310/49 R; 310/156; 310/269
[58] Field of Search .................... 310/49 R, 156, 157, 310/269

[56] References Cited

U.S. PATENT DOCUMENTS

| 3,860,843 | 1/1975 | Kawasaki et al. | 310/67 |
| 4,074,157 | 2/1978 | Lace | 310/67 |
| 4,280,072 | 7/1981 | Gotou et al. | 310/67 |
| 4,575,652 | 3/1986 | Gogue | 310/67 K |
| 4,713,569 | 12/1987 | Schwartz | 310/152 |

FOREIGN PATENT DOCUMENTS 0254053 11/1986 Japan .................................. 310/269

Primary Examiner—Patrick R. Salce
Assistant Examiner—Judson H. Jones
Attorney, Agent, or Firm—Oblon, Fisher, Spivak, McClelland & Maier

[57] ABSTRACT

A motor comprises magnetic poles constituted by a permanent magnet magnetized in its radial direction and a core having salient poles placed inside or outside the magnetic poles wherein the magnetic flux distribution of the permanent magnet is controlled so that the cogging torque characteristic of the motor is rendered to be a specified condition.

10 Claims, 5 Drawing Sheets

MOTOR

This application is a continuation of application Ser. No. 856,354, filed on Apr. 28, 1986, now abandoned.

The present invention relates to a motor having magnetic poles constituted by a permanent magnet and a core with salient poles placed inside or outside the magnetic poles, wherein the permanent magnet is magnetized in its radial direction, wherein the permanent magnet has a ringed structure magnetized in the radial direction to form a number of magnetic poles.

Various types of machines, electric or electronic devices and apparatuses have been developed and improved, and demand of a small-sized motor of high quality, cogging-free and of a large torque has increased.

Although a coreless motor has been used to reduce cogging produced in a motor, the coreless motor has not been able to provide a sufficiently large torque. Accordingly, it was necessary to manufacture a large-sized coreless motor to obtain a large torque.

On the other hand, a motor having salient poles as shown in FIG. 1 is used to obtain a large torque. The conventional motor will be described with reference to FIG. 1, although the motor shown in FIG. 1 is applicable to the present invention.

In FIG. 1, a reference numeral 1 designates a core having a plurality of salient poles 2. Windings are omitted to simplify an illustration. A permanent magnet 3 in a ring form is magnetized in its radial direction to form an alternate arrangement of the N poles and the S poles along the circumferential direction of the ringed permanent magnet. A reference numeral 4 designates a magnetic yoke. Either one of the core 1 and the magnetic yoke 4 is used as a stator and the other is used as a rotor. The motor as shown in FIG. 1 is an outer rotor type motor in which the core 1 is used as the stator and the magnetic yoke 4 is used as the rotor.

Although the motor having the salient poles 2 provides a large torque, it has the drawback that the cogging is produced.

As a technique of reducing the cogging in the motor having the salient poles 2, a method of machining an armature iron core in a specified shape is proposed as in Japanese Examined Patent Publication No. 52426/1983. However, the method of machining the armature iron core is complicated. Further, reduction in the clogging to be attained by the above-mentioned method is insufficient.

Recently, use of rare-earth magnet having a strong magnetic force as the permanent magnet accelerates miniaturization of the motor. However, with the small-sized motor, a problem of the cogging is further conspicuous and it is disadvantage in practical use. In view of the disadvantage of the conventional motor, the inventor of this application has extensively studied on a motor in which a permanent magnet of a ring form which is magnetized in the radial direction and has a number of magnetic poles formed alternately along the circumferential direction is used. The present invention has been established as a result of the extensive study.

It is an object of the present invention to provide a motor of a small-sized, a large torque which minimizes the cogging by precisely controlling an angle and a pattern of magnetization.

The foregoing and the other objects of the present invention have been attained by providing a motor comprising magnetic poles constituted by a permanent magnet magnetized in its radial direction and a core with salient poles placed inside or outside the magnetic poles, characterized in that the permanent magnet has a magnetic flux distribution such that in the cogging torque characteristics of the motor, there are four inflection points in a period of the cogging torque of a revolution angle (360°/i) having evenly spaced or balanced stable points as standard, where i is the leas common multiple between the number of the salient poles and the number of the magnetic poles.

In the drawings

In the following, the present invention will be described in detail.

Figure 1:
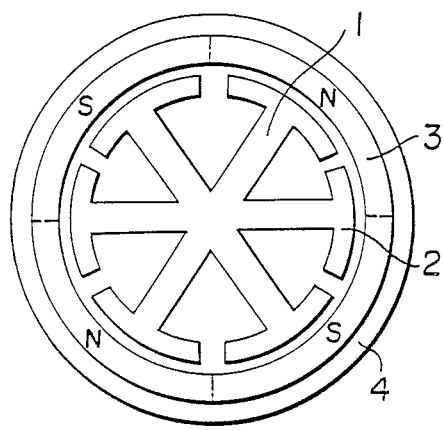
FIG. 1 is a diagram showing a motor comprising four magnetic poles and six salient poles according to an embodiment of the present invention.

In the present invention, the magnetic flux distribution of a permanent magnet is controlled so that the cogging torque characteristic of a motor indicates a specified pattern. Usually, such magnetic flux distribution is obtained by controlling an angle of magnetization or a pattern of magnetization of the permanent magnet. The shape of the permanent magnet is not limited as long as the permanent magnet is magnetized in its radial direction. However, the permanent magnet in a ring form as shown in FIG. 1 is most preferably used. Further, it is recommendable to use a rare-earth magnet which utilizes an intermetallic compound of rare-earth elements and transition metals including cobalt as the main element from the viewpoint of requirement of a high magnetic properties. The ringed permanent magnet can be made by a sintering method or a resin-binding method. It is difficult to form the ringed magnet by the sintering method because of the shape of the magnet. Especially, an anisotropic treatment in the radial direction of the permanent magnet by using the sintering method adversely affects thermal expansion characteristic of the magnet, which result in breaking of the magnet. Accordingly, when the sintering method is used, the permanent magnet is subjected to large restriction in determination of the shape and the magnetic characteristic. On the other hand, the ringed plastic magnet formed by the resin-binding method is well fitted to the purpose of the present invention.

In the following, a typical example of a magnet formed in a ringed shape of the present invention will be described.

A ringed plastic magnet is generally manufactured as follows.

In a mixture of at least two kinds of powder of ferrite and rare-earth magnetic materials, a resinous material is added and the mixture is kneaded. The kneaded mixture is formed into a ring-like molded product by an injection molding or a press molding. The molded product of a ring form is put in a magnetizing device to magnetize it so that plural pairs of the N poles and the S poles are magnetized in an alternate arrangement in the circumferential direction of the molded product. In the present invention, when the molded product is magnetized by using the magnetizing device, an angle of magnetization and a pattern of magnetization are precisely controlled. Namely, the molded product is magnetized so that regions of non-magnetization are provided, or magnetic properties are given to it with a specified distribution (the pattern of magnetization) in a range narrower than a value of (360°/the number of magnetic poles), as different from the conventional technique that magnetization is conducted on the entire surface of the ringed plastic magnet in the radial direction.

Generally, a motor employing a ringed magnet having the entire surface magnetized gives extremely large cogging. In such motor, there produces, as cogging torque characteristics, a cogging torque having a period of a revolution angle (360°/i) in which two balanced stable points are given as standards of the revolution angle, where i is the least common multiple between the number of the salient poles and the number of the magnetic poles. In other words, the cogging torque has two inflection points or points where the cogging torque reaches a maximum value either positively or negatively in such a period.

Figure 3:
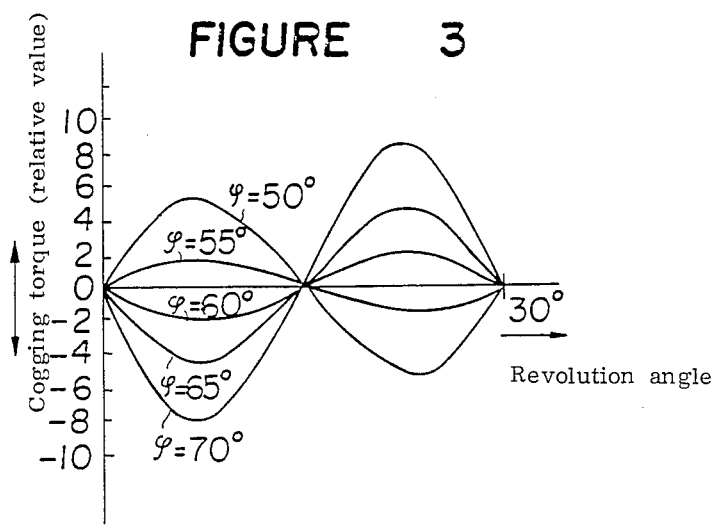
FIGS. 3 and 4 are respectively characteristic diagrams of the cogging torque of the motor shown in FIG. 1 in which an angle of magnetization is used as a parameter.

FIG. 3 shows typical cogging torque characteristics in the case that the angle of magnetization and the pattern of magnetization in a permanent magnet are changed. As shown in FIG. 3, the values of torque are changed while the period of the revolution angle (360°/i) having balanced stable points as standards is unchanged. In the following, the term revolution angle means that it has the balanced stable points as standards. The term the balanced stable point of rotation refer to points where the cogging torque becomes zero and there produces a force directing to the original position when the angle is advanced or delayed from the zero position. In FIG. 3, the characteristic curves for the angles of 50° and 55° are indicated by shifting them by a half ($\frac{1}{2}$) period (15°).

Figure 4:
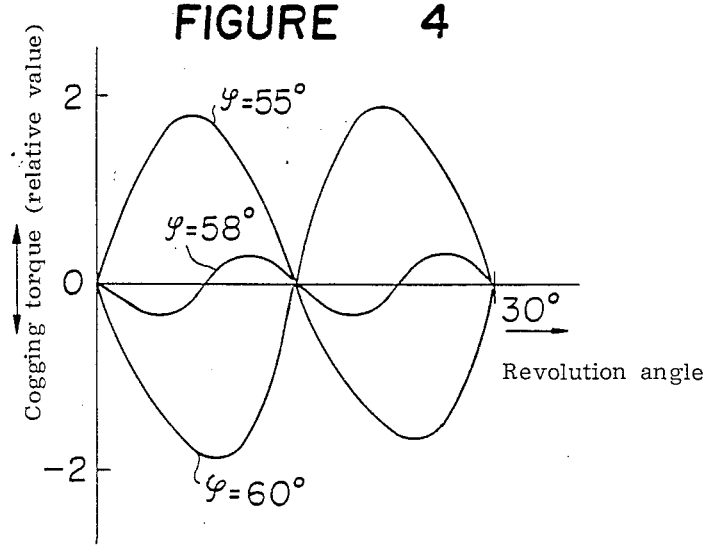

The present inventor has found that the cogging torque characteristics as shown in FIG. 4 are obtainable within an extremely limited range by precisely controlling a magnetic flux distribution such as the magnetization angle and/or the magnetization pattern of the permanent magnet. FIG. 4 shows an example of variation in the cogging torque characteristics. Namely, there is obtainable a pattern having four inflection points in the revolution angle (360°/i). In this case, the cogging torque of the motor becomes extremely small, thus the purpose of the present invention can be attained.

In the motor of the present invention, various patterns of the cogging torque characteristics are obtainable by controlling the magnetic flux distribution.

Figure 5:
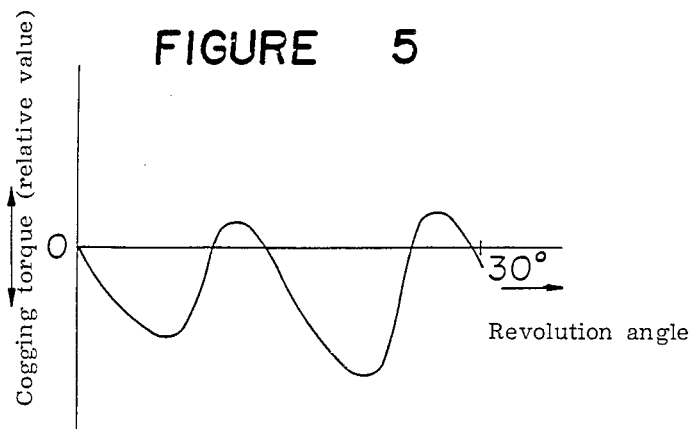
FIGS. 5 and 6 is characteristic diagrams showing another example of the cogging torque of the present invention.
Figure 6:
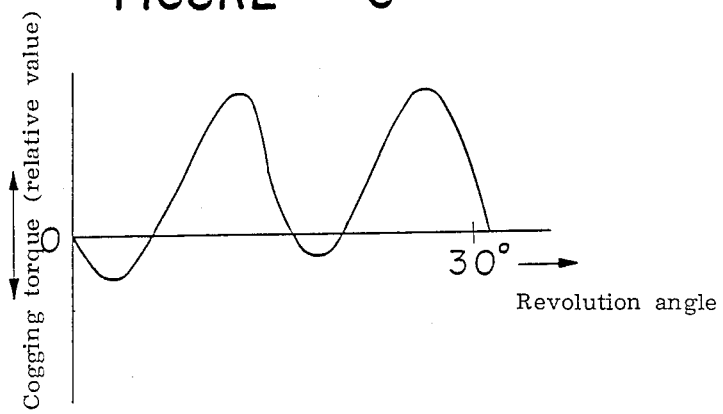
Figure 10:
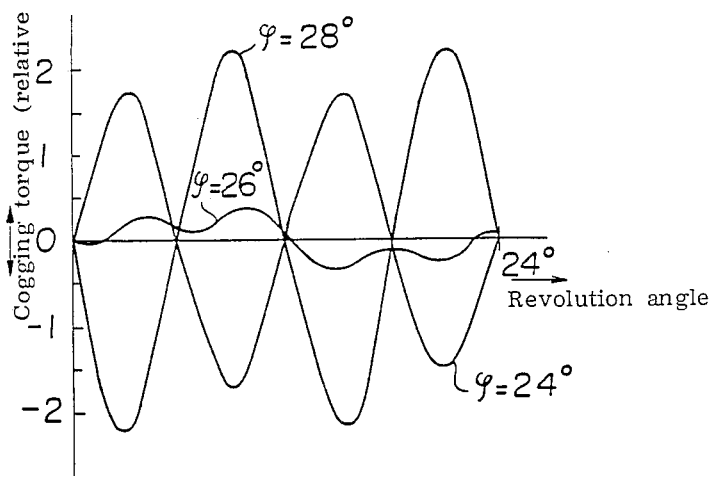
FIG. 10 is a diagram showing a pattern of the cogging torque of a motor comprising 10 magnetic poles and 15 salient poles.

FIGS. 5, 6 and 10 show examples of the patterns. As apparent from the Figures, there are always four inflection points in a period of the cogging torque of the revolution angle (360°/i). The inflection points refer to the points where the gradient is zero in a cogging torque curve. However, in order to minimize the cogging in the motor of the present invention, it is preferable that the four inflection points are not concentrated in a specified revolution angle, but they are dispersed equally in the revolution angle (360°/i). In this respect, it is recommendable that the magnetic flux distribution is controlled to give a cogging torque characteristic in which there are two inflection points in the revolution angle of ($\frac{1}{2}$)(360°/i). In order to minimize the cogging and stabilize revolution of the motor, it is especially preferable that as shown in FIG. 4, two inflection points are respectively formed in the positive polarity area and the negative polarity area with respect to the central point where the cogging torque becomes zero. Accordingly, it is desirable to control the magnetic flux distribution of the permanent magnet to provide five cogging-torque-zero points in either period of the cogging torque having the revolution angle of k.(360°/i). In this case, the k value is a coefficient in the range of $0.85 \leq k \leq 1.15$ (the same definition is applied to the description stated below). This is because depending on condition of controlling of the magnetic flux distribution, there may occur a phenomenon as shown in FIG. 5 or FIG. 6 that the cogging torque curve does not indicate a zero point at the end of a period of the revolution angle (360°/i), but there is displacement of the curve. In other words, the k value means the k value exists in the above-mentioned range, namely, there exists the fifth cogging-torque-zero point. Further, it is preferable in the motor having a small cogging torque and having the characteristic as above-mentioned that the five cogging-torque-zero points are not concentrated in a specified revolution angle, but are dispersed equally in the revolution angle k.(360°/i). Accordingly, it is recommendable to control the magnetic flux distribution in such a manner that three cogging-torque-zero points are provided in any period of the cogging torque of the revolution angle (k/2)(360°/i).

The present invention is to provide a small-sized motor of high quality in which the cogging is minimized and a large torque is provided. From this viewpoint, the motor having a permanent magnet of 5 mm–100 mm in outer diameter, 2 mm–100 mm high and 0.5 mm–10 mm in wall thickness can give remarkable effect.

In the present invention, when a motor having a number of the magnetic poles and a number of salient poles is manufactured, the cogging can be relatively small without controlling the magnetization pattern and so on. Accordingly, the present invention is preferably applicable to a motor in which a relation of the number of the magnetic poles and the salient poles of the motor is $n_1$ (two magnetic poles and three salient poles), $n_2$ (four magnetic poles and three salient poles) and $n_3$ (ten magnetic poles and six salient poles) where $n_1$, $n_2$, $n_3$ are respectively positive integars in the range of $1 \leq n_1 \leq 15$, $1 \leq n_2 \leq 10$, and $1 \leq n_3 \leq 5$.

As described above, the controlling of the magnetic flux distribution of the permanent magnet is extremely effective to reduce the cogging. Further, the controlling of the magnetic flux distribution is also useful to determine whether the cogging characteristic of the motor is excellent or not. Namely, if four inflection points are given in a period of the cogging torque of the revolution angle (360°/i) in measurements of the cogging torque characteristics of a given motor, motor can be provided for practical use without causing the cogging. Thus, the present invention is directly applicable to the judgement of the cogging characteristics of motors.

Preferred embodiments of the present invention will be described with reference to the drawings.

FIG. 1 is a diagram of an embodiment of the outer rotor type motor of the present invention. The motor comprises a core 1 having six salient poles, four magnetic poles 3 and a magnetic yoke 4 as the major parts.

The magnetic poles 3 arranged in a ring form may be of any configuration. In this case, they are made of usual compositions and have a substantially uniform thickness in a cross-section taken along a line perpendicular to the center axis of the ring. Each of the magnetic poles has a pattern of magnetization such as a normal sine waveform or a trapezoidal form, provided that the magnetization pattern is controlled in conformity with the magnetic characteristic of the magnetic yoke 4 in such a manner that the period of a cogging torque is one half as much as the basic period $\theta'i$ of a normally produced cogging torque (where $\theta'i$ is an angle determined by (360°/i) when the least common multiple between the number of the magnetic poles 3 and the number of the salient poles is given as i). Namely, $\theta i = \frac{1}{2}\theta'i$.

The cogging is a ripple of rotation which is produced when the motor is driven. The ripple of rotation is resulted from a force (a cogging force) produced when the force acting on each part of the magnetic poles is not symmetric with respect to the rotation depending on a relative position of the rotation between the salient poles 2 and the magnetic poles 3. The cogging torque has a period of (360°/i) where i is the least common multiple between the number of the salient poles and the number of the magnetic poles.

In the motor shown in FIG. 1, it has six salient poles and four magnetic poles. Accordingly, i=12, hence, the period of the cogging torque is 30°.

Figure 2:
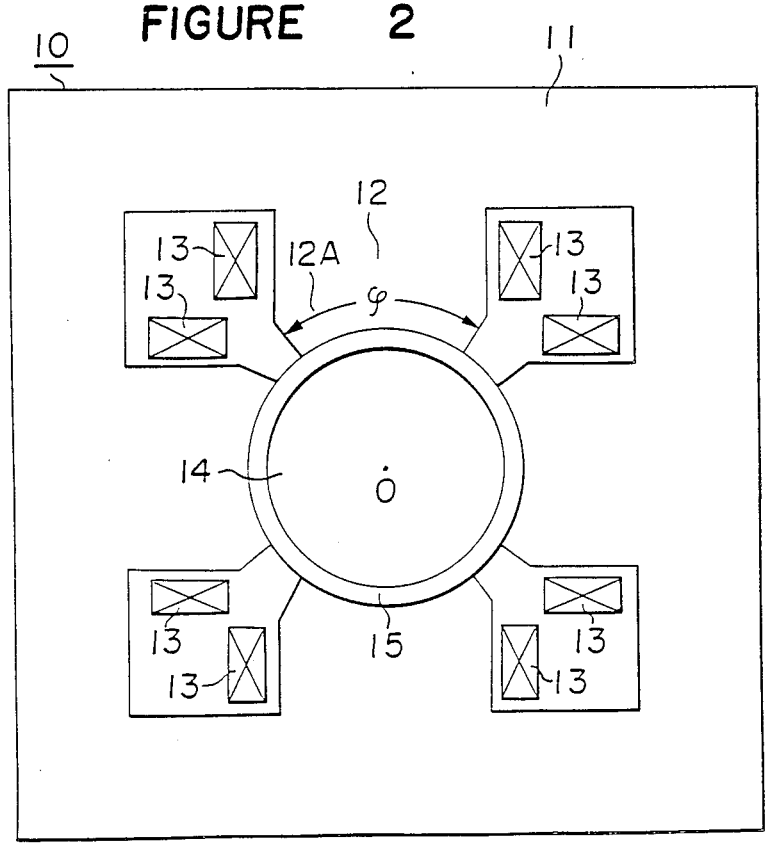
FIG. 2 is a diagram showing an embodiment of a magnetizing device used for magnetization of a permanent magnet shown in FIG. 1.

FIG. 2 is a diagram showing a magnetizing device 10 to magnetize a ringed permanent magnet to form four magnetic poles. In FIG. 2, a reference numeral 11 designates a yoke having four outer cores 12 in which exciting coils 13 are provided. A numeral 14 designates an inner core. A magnetic material 15 having a ring form is put between the outer cores 12 and the inner core 14, and the magnetic material 15 is magnetized to form magnetic poles 3. The width of magnetization of the magnetic material 15 is controlled by forming slant portions having an angle of $\psi$ in respective projecting parts 12A of the outer cores 12 with respect to the center O.

When each of the projecting parts 12A is magnetized by changing the angle $\psi$, the cogging torque characteristic with respect to the revolution angle of the rotor (consisting of magnetic poles 3 and the magnetic yoke 4) of the motor shown in FIG. 1 is shown in FIG. 3. In FIG. 3, the cogging torque is zero at positions of the revolution angles of 0°, 15° and 30°. However, scattering in the period may take place due to scattering in magnetization.

As apparent from FIG. 3, the magnitude of the cogging torque varies by changing the angle $\psi$ of magnetization. The cogging torque becomes smaller in the range between 55° and 60°. The phase of the cogging torque is inversed in the angle ranging 55°-60°.

FIG. 4 shows in detail the cogging torque characteristics between 55° and 60°. Namely, in the region of phase transition, the cogging torque characteristic assumes a torque pattern in which torque patterns having different phases are composed, whereby a period of the cogging torque is one half of the original period. In other words, there are four inflection points in a period of the revolution angle of 30° and there are five cogging-torque-zero points. More specifically, two inflection points are provided in a period of the revolution angle of 15° and there are three cogging-torque-zero points. The motor having the above-mentioned characteristic minimizes occurrence of the cogging.

In the cogging torque characteristic shown in FIG. 4, the torque pattern sometimes does not show a correct form, but it may show a complicated pattern as shown in FIG. 5 or FIG. 6. However, the torque pattern has four inflection points in the period of the revolution angle of 30°. The motor having the above-mentioned characteristic remarkably reduces the cogging unlike the conventional motor having the cogging torque characteristic as shown in FIG. 3. Accordingly, it is possible to control the magnetization pattern by changing the shapes of the outer cores 12 and the inner core 14 of the magnetizing device 10 and by changing a current for magnetization while observing variation in phase of the cogging torque so as to obtain the period of the cogging torque as above-mentioned. In the region having such torque pattern, the cogging torque can be sufficiently reduced and therefore, a micro-motor of a high performance can be designed.

Figure 7:
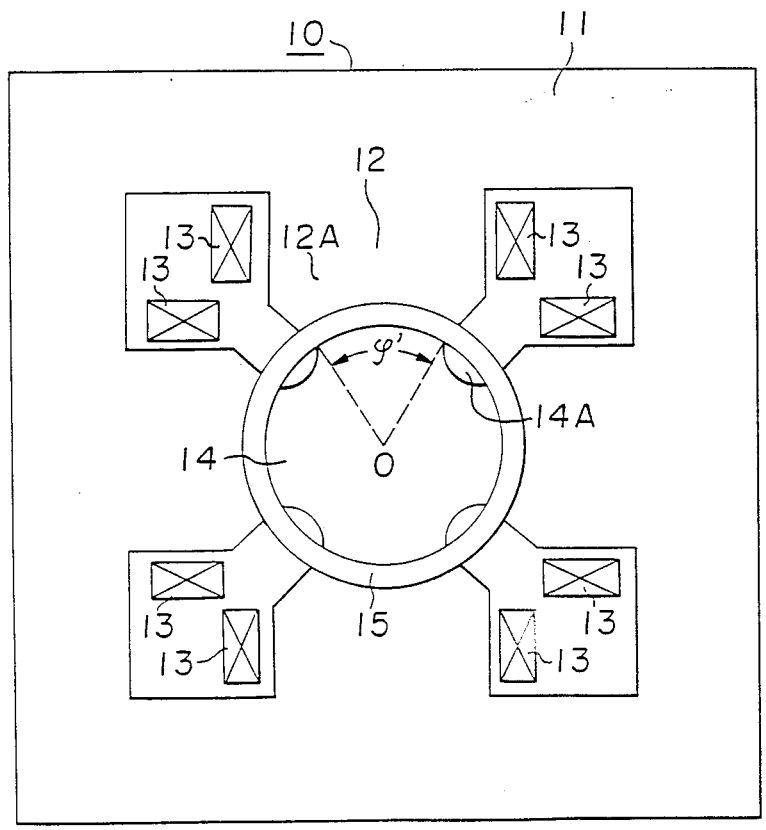
FIG. 7 is a diagram showing another magnetizing device.

FIG. 7 shows the magnetizing device 10 for explaining another method of magnetization. Grooves 14A are formed in the inner core 14 so that the angle $\psi'$ is continuously changed at the inside of the magnetic material 15 of a ring form. Change in the angle $\psi'$ is conducted in such a manner that a number of the inner cores 14 each having a different angle are previously prepared and the inner core 14 is replaced by the other in accordance with an angle required. The method of changing the angle may be any suitable one as long as the strength of magnetization for each of the magnetic poles can be continuously changed.

Figure 8:
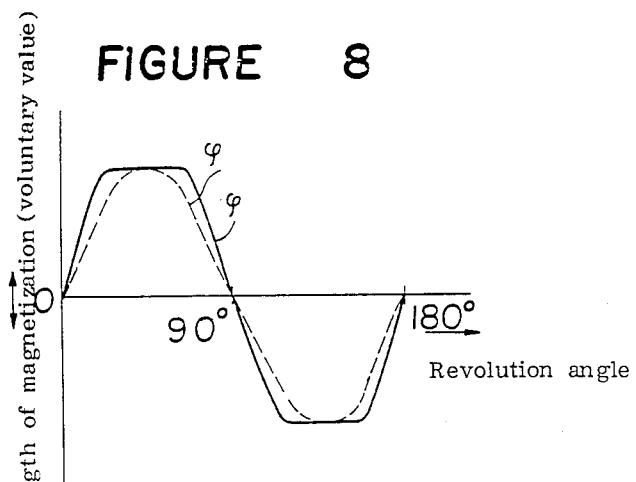
FIGS. 8 and 9 are respectively characteristic diagrams showing a distribution of the magnetization of a magnetic pole in each of embodiments of the present invention.
Figure 9:
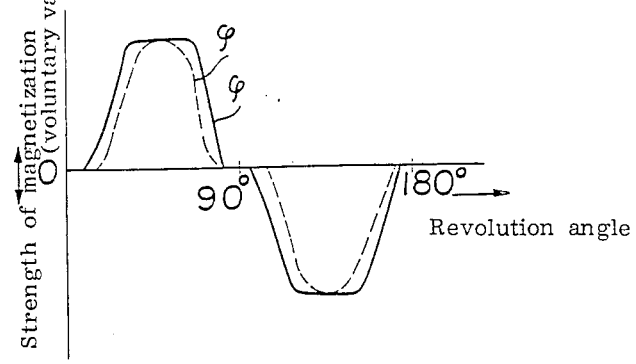

In measurements of the strength of magnetization for each of the four magnetic poles 3 in a ring form, magnetization curve as indicated by solid lines or broken lines as in FIGS. 8 and 9 can be obtained.

In the following, another embodiment of the present invention will be described. FIG. 10 shows the cogging torque characteristic of a motor having ten magnetic poles and fifteen salient poles. In FIG. 10, $\psi$ refers to an angle formed at the end portion of each of the outer cores 12 in the magnetizing device 10 in the same manner as in FIG. 2. The phase of the cogging torque is changed by changing $\psi$ as in FIG. 3. When the magnetization angle $\psi$ is 26°, there are four inflection points in the basic period $\theta'i = 12°$ of the cogging torque.

When the motor has a number of magnetic poles and the salient poles, the absolute value of the cogging torque having the period as above-mentioned is sometimes smaller than the cogging torque having a period of $2\theta'i$ which is produced due to scattering of the strength of the magnetization of the N poles and the S poles. Accordingly, sometimes, it is difficult to determine the period of the cogging torque of the present invention in view of the cogging torque characteristics. In this case, when the basic period $\theta'i$ of the cogging torque is 12°, the cogging torque pattern at or near the revolution angle $\psi=26°$ which causes inversion of the phase of the torque in the instant period shows a complicated shape. At a glance, the torque pattern seems to have the period of $2\theta'i$. This is because the absolute value of the cogging torque having the above-mentioned period is extremely small due to increase in number of the magnetic poles and the salient poles of the motor, and it is smaller than the cogging torque produced due to scattering of the strength of the magnetization of the N poles and the S poles. However, when viewed in detail, the cogging torque of $\theta'i$ is found on the cogging torque of the period of $2\theta'i$.

Figure 11:
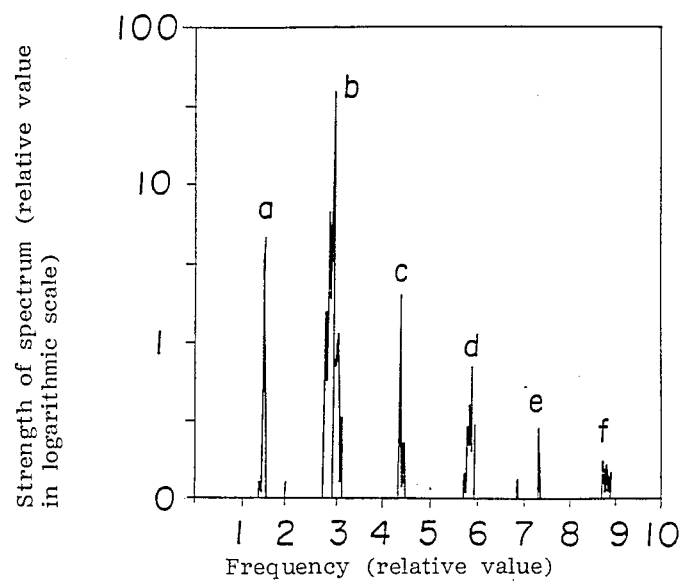
FIGS. 11 and 12 are respectively diagrams showing power spectra obtained by frequency analysis of the cogging torque in which angles of magnetization are respectively $\psi=28°$ and $\psi=26°$.
Figure 12:
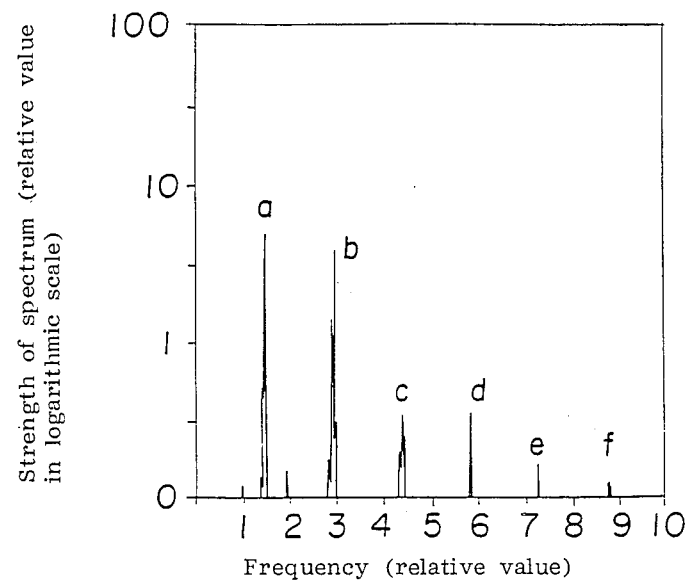

FIGS. 11 and 12 are respectively power spectrum diagrams obtained by frequency analysis of the cogging torque at the revolution angles $\psi$ of 28° and 26° in FIG. 10. When $\psi=28°$, the strength of the spectrum b corresponding to the basic period $\theta'i$ is extremely large. Namely, it is about 70 times as much as the strength of the spectrum d corresponding to the period $\theta i$ and is about 6 times as much as the strength of the spectrum a corresponding to the period of $2\theta'i$.

When $\psi=26°$, the strength of the spectrum b is about 12 times as much as the strength of the spectrum d. Accordingly, the spectrum a shows the greatest value. The fact that the strength of the spectrum b is greater than the spectrum d mainly owes to high frequency components produced when the cogging torque pattern having the period of $2\theta'i$ is deviated from a sine wave.

The cogging torque can be judged by a power spectrum. When the strength of the spectrum b corresponding to the basic period $\theta'i$ of the cogging torque is about 30 times or smaller than the strength of the spectrum d corresponding to the period $\theta i$ of the cogging torque of the present invention, the magnetic poles having the value of magnetization can be used for a motor which minimizes the cogging torque. Thus, the magnetization angle and the magnetization pattern can be precisely controlled by changing the power spectrum. In summary, the phase of the cogging torque having the period of $\theta'i$ is detected and at the same time, the cogging torque having the period of $\theta'i$ is reduced, with the result of obtaining the cogging torque having the period of $\theta'i$ as a torque pattern.

I claim:

1. A motor comprising magnetic poles constituted by a permanent magnet magnetized in its radial direction and a core with salient poles placed inside or outside said magnetic poles wherein the salient poles are distributed at equal angular positions and wherein said magnetic poles have the same surface area, and wherein the magnetic flux distribution of the pattern of magnetization formed by said poles is a function of the spacings of the poles of the permanent magnet such that in the cogging torque characteristics of said motor, there are four inflection points in a period of the cogging torque of a revolution angle (360°/i) having balanced table points as standards, where i is the least common multiple between the number of said salient poles and the number of said magnetic poles.

2. The motor according to claim 1, wherein there are two inflection points in the period of the cogging torque of a revolution angle $(\frac{1}{2})(360°/i)$ having balanced stable points as standards.

3. The motor according to claim 1, wherein there are five cogging-torque-zero points in a period of the cogging torque of a revolution angle k.(360°/i) having balanced stable points as standards, where k is the number in the range of 0.85-1.15.

4. The motor according to claim 3, wherein there are three cogging-torque-zero points in a period of the cogging torque of a revolution angle (k/2)(360°/i) having balanced stable points as standards.

5. The motor according to claim 1, wherein said magnetic flux distribution is controlled by adjusting an angle of magnetization.

6. The motor according to claim 1, wherein said magnetic flux distribution is controlled by adjusting a pattern of magnetization.

7. The motor according to claim 1, wherein said permanent magnet constituting the magnetic poles is in a ring form.

8. The motor according to claim 1, wherein said permanent magnet constituting the magnetic poles is a plastic magnet.

9. The motor according to claim 1, wherein said magnetic poles and said salient poles of the motor has a relation of $n_1$ (two magnetic poles and three salient poles), $n_2$ (four magnetic poles and three salient poles) or $n_3$ (ten magnetic poles and six salient poles), where $n_1$, $n_2$, $n_3$ are respectively positive integers in the ranges of $1\leq n_1 \leq 15$, $1\leq n_2 \leq 10$ and $1\leq n_3 \leq 5$.

10. The motor according to claim 7, wherein said permanent magnet is in a ring form in which the outer diameter is in the range of 5 mm-100 mm, the height is in the range of 2 mm-100 mm and the wall thickness is in the range of 0.5 mm-10 mm.

* * * * *